United States Patent [19]
Berlin et al.

[11] 3,868,348
[45] Feb. 25, 1975

[54] THERMOSTABLE HETEROCYCLIC POLYMERS OF AROMATIZED BIS ADDUCTS OF DIELS-ALDER REACTION BETWEEN MALEIC ANHYDRIDE AND BISFURANIC COMPOUNDS

[76] Inventors: Alfred Anisimovich Berlin, Lenisky prospekt, 57, kv. 9; Boris Izrailevich Liogonky, ulitsa 26 bakinskikh komissarov, 7, korpus 4, kv. 45; Boris Isaakovich Zapadinsky, prospekt Vernadskogo, 11/19, kv. 221, all of Moscow, U.S.S.R.

[22] Filed: May 14, 1973

[21] Appl. No.: 359,890

Related U.S. Application Data

[63] Continuation of Ser. No. 102,910, Dec. 30, 1970, abandoned.

[52] U.S. Cl...... 260/47 CP, 260/30.2, 260/30.8 DS, 260/32.6 N, 260/33.4 P, 260/33.8 K, 260/45, 260/65, 260/78 TF, 260/78 UA
[51] Int. Cl............................................ C08g 20/32
[58] Field of Search........ 260/47 CP, 65, 45, 78 TF, 260/78 UA, 326.3 N

[56] References Cited
UNITED STATES PATENTS

| | | | |
|---|---|---|---|
| 3,179,632 | 4/1965 | Hendrix | 260/78 |
| 3,179,634 | 4/1965 | Edwards | 260/78 |
| 3,414,543 | 12/1968 | Poufler | 260/47 |
| 3,532,673 | 10/1970 | Bell, Jr. et al. | 260/78 |

*Primary Examiner*—Lester L. Lee
*Attorney, Agent, or Firm*—Holman & Stern

[57] ABSTRACT

Thermostable heterocyclic polymers which are polyimides, polyimidazopyrrolones, and copolymers of an imide and imidazopyrrolonic structure are produced by the method in which aromatizated bis-adducts of the Diels-Alder reaction between maleic anhydride and bis-furanic compounds are reacted with an amino component which may be aromatic di- or tetramines as well as their mixtures.

18 Claims, No Drawings

THERMOSTABLE HETEROCYCLIC POLYMERS OF AROMATIZED BIS ADDUCTS OF DIELS-ALDER REACTION BETWEEN MALEIC ANHYDRIDE AND BISFURANIC COMPOUNDS

This is a continuation of application Ser. No. 102,910, filed Dec. 30, 1970, now abandoned.

The present invention relates to production of thermostable heterocyclic polymers and, more particularly, has reference to polymers formed during the reaction of anhydrides of tetracarboxylic acids with an amino component selected from the group consisting of aromatic diamine, aromatic ortho, ortho- or peri,-peri-tetramine, a mixture of aromatic diamine and aromatic tetramine.

Further we will designate the polymers obtained during the reaction of dianhydride with aromatic diamine as ПИ (PI), with aromatic tetramine as ПП (PP), and with a mixture of aromatic di- and tetra-amines as ПИП (PIP).

The polymers of the above-said classes are well known in the art, while some of these compounds, methods of production thereof, modifications and associated products have been patented.

The mechanism of formation of these products through a two-stage reaction is well known. The first stage is used for preparing prepolymers - polyamide acids soluble in aprotic solvents, which polymers will further be designated as ПAK (PAK) in the case of application of diamines or polyamide acids and as ПAAK (PAAK) in the case of application of tetramines;

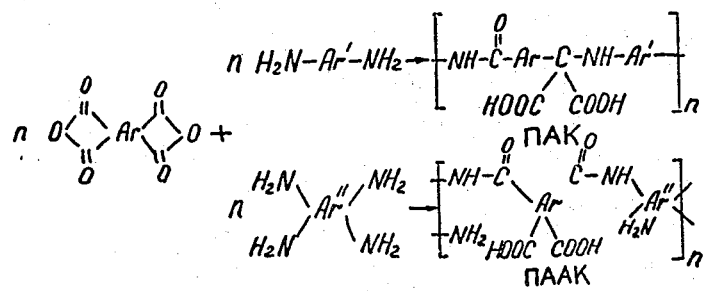

During the second stage reactions of intermolecular cyclization take place under the effect of high temperatures, which leads to formation of ПИ or ПП structures:

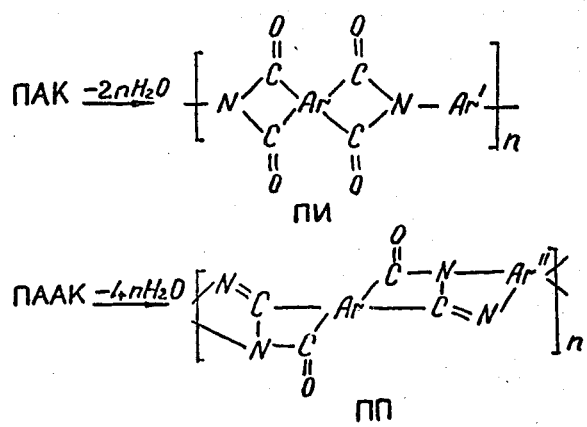

Also known in the art is a method of single-stage production of polymers when conducting the reaction in polyphosphoric acid.

The above-said polymers feature outstanding stability to thermal and thermo-oxidizing destruction while having high physico-chemical and mechanical characteristics.

Although synthesis has been effected for producing a whole number of the above polymers with the use of various dianhydrides of tetracarboxylic acids and amines, a general method of producing the polymers with predetermined properties is still unknown in the art.

Another important property of the above-said polymers determining their industrial application is their ability to be formed into articles. The reason is that these polymers are processed as a rule, and sometimes solely, at a stage of prepolymer. This is associated with the fact that the cyclizated products have a very high softening temperature and are soluble only in concentrated mineral acids. The ПП polymers obtained by means of compounds, containing five-number anhydride cycles, after the cyclization are not soluble at all and have a cross linked structure.

The processing of the above-said polymers in the prepolymer stage has a number of significant disadvantages. Formation of films, fibers and other articles according to this method does not allow the maximum mechanical strength to be obtained due to the disturbance of the microstructure of the article by steam evolved in the process of intermolecular cyclization. In addition, the solvents used for the synthesis of prepolymer are usually extremely difficult for removing from the polymer prior to the cyclization. The removal of the solvent during the cyclization at high temperatures also reduces the strength of the article.

Also known in the art is a method of making fibres from solutions of the above-said polymers in concentrated sulphuric acid. However, realization of this method is associated with some difficulties in conducting this process.

An object of the present invention is to eliminate these disadvantages.

Another object of the invention is to provide a method of producing polymers having predetermined physical and chemical properties.

Still another object of the invention is to develop a process of synthesis of polymers capable of being processed from solutions in conventional organic solvents into articles having high thermal, thermo-oxidizing and ablation stability.

Yet another object of the invention is to provide a synthesis of the ПП polymers having a high thermal resistance and adapted to be processed after the cyclization from solutions in sulphuric acid into fibres.

Other objects and advantages of the present invention will be apparent from the following detailed description of the invention.

According to the present invention, the above-mentioned objects are attained due to synthesis of polymers the structure of which is described by the following formulae.

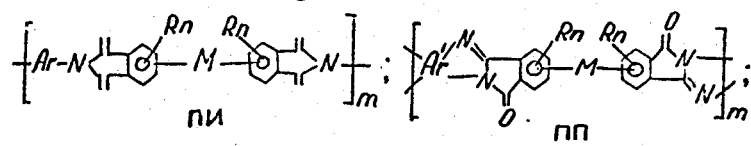
пи

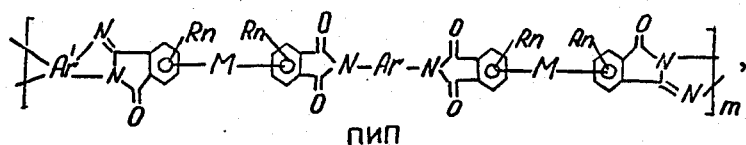
пп

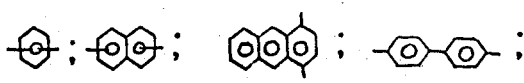
пип wherein M is a. —CH=N—R¹—N=CH—, R¹ is arylene selected from the group consisting of

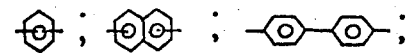

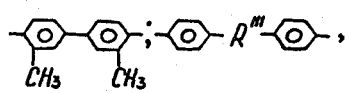

R¹¹ is selected from the group consisting of $CH_2, O, SO_2, S, NH$;

b. arylene selected from the group consisting of

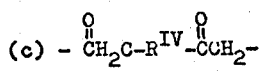

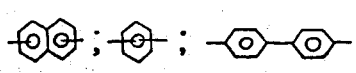

R''' is selected from the group consisting of $CH_2$, O, $SO_2$;

c.

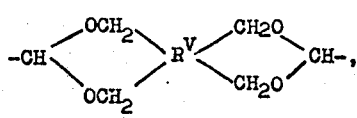

$R^{IV}$ is arylene selected from the group consisting of

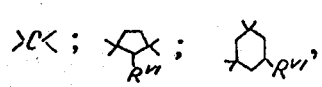

d.

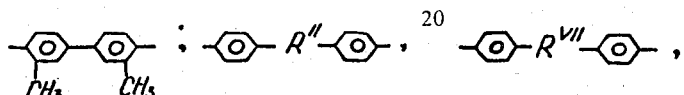

$R^V$ is selected from the group consisting of $>C<$;

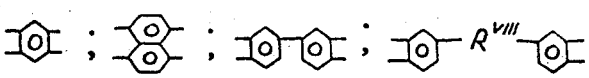

$R^{VI}$ is selected from the group H, OH, =O.

e. M is absent.

R is selected from the group consisting of an H atom, phenyl, naphthyl;

n is a number including 1 and 2;

Ar is arylene selected from the group consisting of

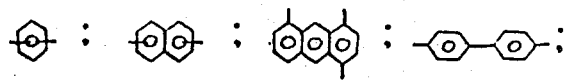

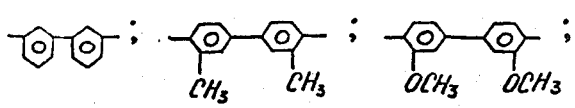

$R^{VII}$ is selected from a group consisting of $CH_2$, O, $SO_2$, S, NH;

Ar' is a tetravalent aromatic radical selected from the group consisting of

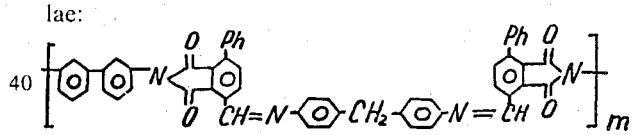

$R^{VIII}$ is selected from the group consisting of $CH_2$, O;

m is a number adequate for providing an intrinsic viscosity of the polymers in a solution of sulphuric acid not less than 0.06 at 25°C.

The most interesting among the proposed polymers are the products represented by the following formulae:

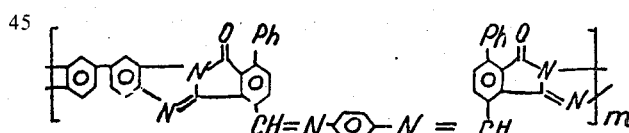

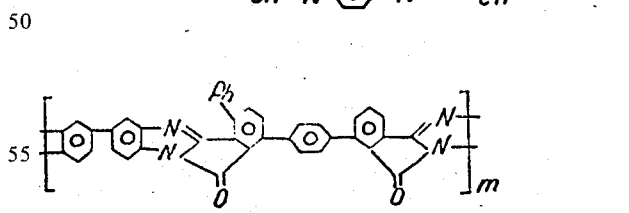

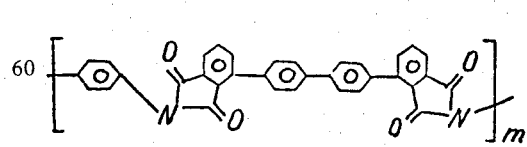

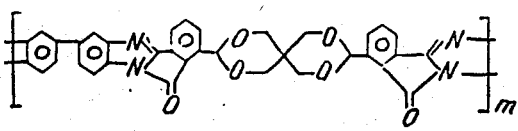

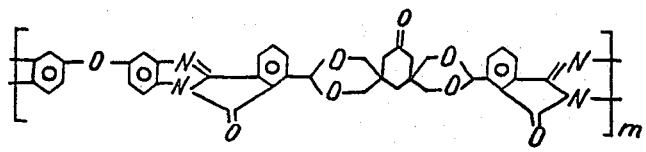

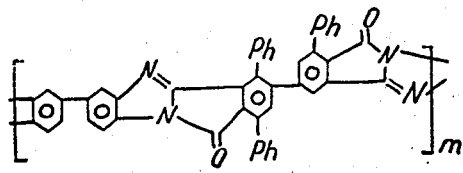

The synthesis of the polymers is effected by reacting an amino component as aromatic diamine, aromatic ortho, ortho- or peri-, peri-tetramine or their mixture with aromatized bis-adducts of the Diels-Alder reaction between maleic anhydride and bis-furanic compounds with an excess of one of the initial monomers not higher than 10% at a temperature of 0°–350°C in an atmosphere of an inert gas — Ar, $N_2$, $CO_2$, He, during a time required for obtaining an intrinsic viscosity of the solution of the above-mentioned polymers in sulphuric acid of at least 0.06 dl/g.

The above bis-adducts consist of the following group of products:

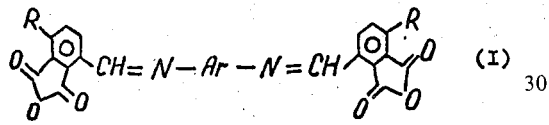

where Ar stands for arylene, for example

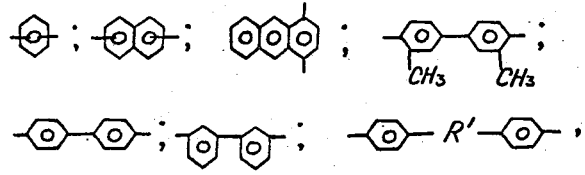

where R' is $CH_2$, O, $SO_2$, S, NH, where R stands for an H atom or aryl, e.g. phenyl, naphthyl

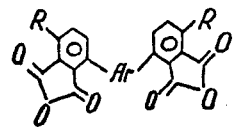

where Ar stands for arylene, e.g.,

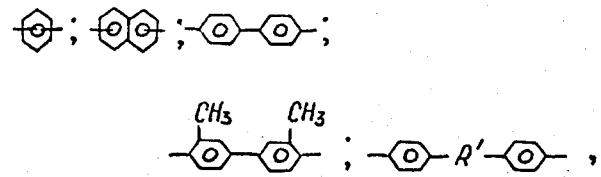

where R' stands for $CH_2O$, $SO_2$. R stands for an H atom or aryl, e.g., phenyl, naphthyl.

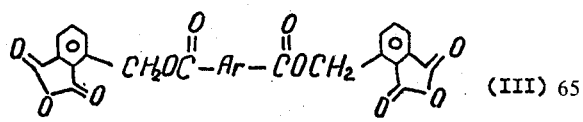

where Ar stands for arylene, e.g.

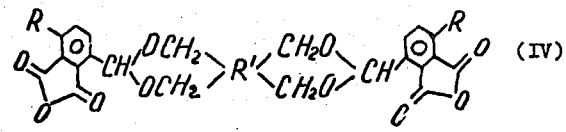

where R' stands for >C<;

R" = H, OH, = O. R stands for an H atom or aryl, e.g. phenyl, naphthyl

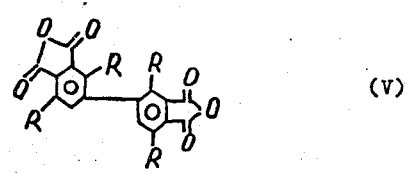

where R is phenyl.

The amino component for synthesis of the above-said polymers was composed of p- and m-phenylenediamines, benzidine, toluidine, anisidine, 3,3'-diaminodiphenyl, 4,4'-diaminodiphenylmethane, 4,4'-diaminodiphenyloxide, 4,4'-diaminodiphenylsulphone, 4,4'-diaminodiphenylsulphide, 4,4'-diaminodiphenylamine,1,5-, 1,8- and 2,7-diaminonaphthalenes, 1,4-diaminoantracene, 3,3'-diaminobenzidine, 3,3',4,4'-tetraaminodiphenylmethane, 3,3'- and 4'-tetraminodiphenyloxide, 1,2,4,5-tetraminobenzene, 1,4,5,8-tetraminenaphthalene, as well as hydrochlorides of the above-mentioned amines.

The proposed polymers were produced both by means of a two-stage process, i.e., through a stage of separating a prepolymer, and by a single-stage method. The synthesis of the proposed polymers by the two-stage method was effected in a medium of an aprotic solvent, i.e., N,N-dimethylformamide, dimethylsulphoxide, N,N-dimethylacetamide, N-methylpirrolidone, having a general concentration of the initial monomers: Bis-adduct and a free base of amine of 5 to 15% at temperatures of 0° to 100°C in a flow of an inert gas: Ar, $N_2$, $CO_2$ or He purified from traces of oxygen. The reaction time is varied within the range of 4 to 24 hours depending on a desirable value of the molecular weight of the prepolymer. The ratio between the monomers introduced into the reaction is quite important.

The most high-molecular products have been obtained at equimolecular ratios of the initial monomers in the solution of dimethylsulphoxide with a total concentration of the reagents of 8–10% at a temperature of 55°–75°C.

Where bis-adducts are used which are sparingly soluble in dimethylsulphoxide, additions of inorganic salts such as LiCl, KCl, NaCl, KBr, KJ in an amount of 0.1–0.2 mole per litre of the reaction solution, in which case the molecular weight of the produced prepolymers is increased.

The intermolecular cyclization was effected by heating a prepolymer in the form of a powder, film, fibre, etc., to a temperature of 150°–350°C in a vacuum of $10^{-1}$ to $10^{-5}$ mm Hg.

The production of the polymers by the single-stage method in a polyphosphoric acid was effected through slowly heating equimolecular quantities of a bis-adduct and amine hydrochlorides in an atmosphere of an inert gas: Ar, $N_2$, $CO_2$, He, having a total concentration of the monomers within 1 to 7% by weight to a temperature of 160°–210°C, the reaction mixture being held at this temperature during 4 to 24 hours. An additional cyclization was effected in accordance with the known technique used for cyclization of forpolymers.

The structure of the synthesized polymers is identified by their elementary analysis and study of their infrared spectra. In the process of transfer from the ⌐⌐AK or ⌐⌐AAK structures to the cyclizated polymers the absorption bands characterizing the OH and NH bonds disappear at 2900 and 3400 $cm^{-1}$, the bands of tertiary nitrogen appear at 1565 and 1380 $cm^{-1}$, the absorption of amide carbonyl disappears at 1665 $cm^{-1}$, an intensive absorption of the C=O group appears at 1708 $cm^{-1}$. These changes have been noticed for the known ⌐⌐ and ⌐⌐⌐ structures as well as for the model compounds.

The synthesis of all the above-numbered bis-adducts was effected according to a similar scheme:

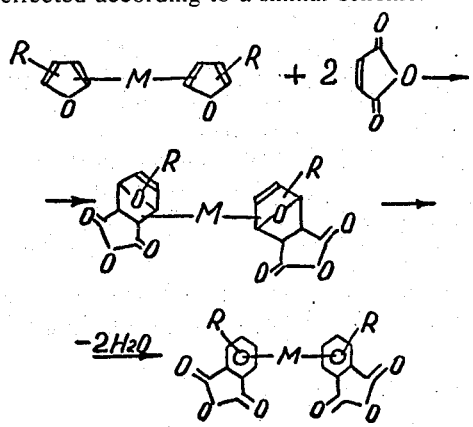

The fact that all the above-mentioned bis-adducts are produced by a simple and, what is most important, similar method, opens the way for widely varying their structure and allows one to change the structure of the polymers, thus changing their properties within a wide range.

Thus, the polymers produced by using the bis-adducts of structures I and II with R=H are highly stable to thermooxidizing desctruction (the thermostability data are given in Table, points 1, 2, 8, and 12) and this property is combined with a high ablation resistance. They are capable of forming films at the prepolymer stage, which films after a heat treatment acquire properties characteristic of the ⌐⌐ and ⌐⌐⌐ structures.

These polymers after the cyclization are soluble in concentrated mineral acids and can be processed into fibres by a known method. This is rather an unexpected feature, because, as stated above, the known ⌐⌐⌐ compounds produced by using five-member dianhydrides are not soluble in the known solvents.

The proposed method of producing the polymers makes it possible to obtain products soluble in conventional organic solvents such as cresoles, phenoles, chlorobenzenes, pyridine.

It should be noted that the ⌐⌐ and ⌐⌐⌐ compounds are featured by all properties of polymers having a system of conjugated bonds. Poor solubility and high melting temperatures are characteristic features of such compounds and are caused by intensive intermolecular interactions. A change in the polymer structure effected due to a change in the structure of the initial compounds, in our case — dianhydride, allows the intermolecular forces to be reduced. At least two methods are available for solving this problem.

The first method envisages provision of a macromolecule of the polymer with portions having an adequate thermal stability but having no systems of conjugated $\pi$-bonds.

This method is effected in our case by means of synthesis of the polymers produced with the use of bis-adducts of the III and IV structures with R = H, wherein the portions of conjugation are separated by spiranic or ester groups. The spiranic structures are known to be the systems having an adequate thermal stability, because in this case to reduce the molecular weight of the polymer a break is required of at least two chemical bonds. At the same time, the products of such a structure having no extended $\pi$-electron systems are soluble in a number of organic solvents. The ⌐⌐⌐ polymers produced from the bis-adducts of the IV structure feature a high resistance to thermo-oxidizing destruction (see Table and points 4 and 5), and are soluble in cresoles, phenoles, and pyridine.

The polymers based on the bis-adducts of the III structure are interesting from the point of view of modification of thermal properties of polyesters as, on heating these polymers, the weakest polarized ester bonds are broken first.

However, introduction of imide or imidasopropyrrolonic structures into the macromolecule increases the thermal stability of the polymer as compared with the known polyesters by 50°–60°C (see Table, points 6 and 7). The polymers are soluble in phenoles, chlorobenzene, pyridine.

Provision of steric hindrance to the effect of the intermolecular actions is another trend permitting the solubility of the polymers to be increased without significant reduction of the melting point or the temperature of decomposition of these polymers.

According to the proposed method the production of the macrochains with side substituents is obtained by introducing aryl (phenyl or naphthyl) substituents into the molecule of the initial bis-adduct of the structure, I, II, IV, V, where R = phenyl, naphthyl. In order to obtain the bis-furanic compounds, 5-aryl-furfural or α-arylfuranes are employed which are produced by means of the Meerwein and Gomberg-Bachman arylation reactions respectively.

The polymers produced on the base of aryl-substituted bisaducts have a high thermal stability — the lower limit of the decomposition temperature is within the range of 470°–500°C (cf. Table, points 3, 5, 12, 10) which is only 5–10% lower than that of respective non-substituted analogs, while being soluble in dimethylformamide, dimethylsulphoxide, and m-cresole. These polymers are capable of forming films from solutions.

In addition to the thermal stability and solubility, the proposed method makes it possible to control the other properties of the snythesized polymers. Thus, the polymers produced with the use of bis-adducts of the class I having R = H and Ar = N—C$_6$H$_4$—O—C$_6$H$_4$—p and p—C$_6$H$_4$—CH$_2$—C$_6$H$_4$—p feature the highest ablation resistance among the said polymers, although their thermal stability is lower than that of the similar polymers having no oxygen or methylene bridges.

The polymers of a mixed imide and imidasopyrrolonic structure (ПИП) have also been produced by means of condensation of the above-mentioned bis-adducts with a mixture of aromatic di- and tetramines. This method makes it possible to reduce the consumption of costly tetramines due to the use of rather inexpensive diamines. The amount of the diamine introduced into the reaction mixture was varied from 5 to 95% of the total charge and was determined by the requirements as to the value of the thermal stability of the copolymers obtained, because the ПИП properties are intermediate between the ПП and ПИ (cf. the Table, points 13, 14).

Further modification of the properties of the proposed polymers is obtained due to the use of the above-said bis-adducts in conjunction with dianhydrides of pyromellite, naphthalenetetracarboxylic perylenetetracarboxylic benzenephenoltetracarboxylic and diphenyltetracarboxylic acids. This method makes it possible to vary the thermal, ablation, and electric properties of the polymers. The molar ratio of the dianhydride and the bis-adduct was varried within the range of 0.01:1 to 1:0.01.

·The polymers according to the present invention can easily be processed into films, fibres, foam plastics, moulded articles and can also be used as a binder for laminated plastics by means of the known methods; i.e., at the prepolymer stage. The polymers produced by the single-stage method are used for producing strong fibres from solutions in a concentrated sulphuric acid, in which case all the synthesized polymers form in the sulphuric acid solutions of an adequate concentration for spinning a fibre.

The proposed polymers are advantageous in that they are adapted for processing into articles from such solvents as cresoles, substituted phenols, chlorobenzenes, and pyridines. The treatment of a polymer, in which the processes of intermolecular cyclization is principally over, allows the mechanical strength of the article to be increased.

The proposed polymers can be used in all fields of engineering where the polymer material should meet strict relation to thermal, thermo-oxidizing, ablation and radiation stability.

The invention will be better understood by those skilled in the art from the detailed description of some embodiments of the invention given below.

| 1 | | 530 |
|---|---|---|
| 2 | | 470 |
| 3 | | 500 |
| 4 | | 410 |
| 5 | | 415 |
| 6 | | 385 |
| 7 | | 380 |
| 8 | | 470 |

Continued

| | | |
|---|---|---|
| 9 | (structure) | 460 |
| 10 | (structure) | 510 |
| 11 | (structure) | 480 |
| 12 | (structure) | 460 |
| 13 | (structure) | 515* |
| 14 | — // — | 485** |

EXAMPLE 1

5 mmoles of bis-adduct of the Formula I (Ar = ;

R=H) and 5 mmoles of free base of 3,3',4,4'-tetraminodiphenylmethane in 70 ml of dimethylsulphoxyde (DMSO) was heated during 18 hours in an argon atmosphere at 75°C. The solution was precipitated into absolute methanol, the precipitate was filtered off, washed with methanol and dried at 60°C under a vacuum of $10^{-2}$ mm Hg. 78% ⊓AAK polymer was produced.

Found in per cent: C, 66.3; H, 5.03; N, 12.94. Calculated for $C_{37}H_{32}N_6O_6$: C, 67.6; H, 4.87; N, 12.8.

The heat treatment of the ⊓AAK polymer at 300°C in a vacuum of $10^{-5}$ mm Hg leads to the ⊓⊓ structure. The output is equal to 84%.

Found in per cent: C, 76.9; H, 3.14; N, 14.87. Calculated for $C_{37}H_{20}N_6O_2$; C, 76.5; H, 3.44; N, 14.5. The intrinsic viscosity ($\eta$) is equal to 0.34.

EXAMPLE 2

5 mmoles of tetrachlorhydrate of 3,3'-diaminobenzidine in 115 ml of polyphosphoric acid was slowly heated in an argon flow to a temperature of 130°–140°C until the end of evolution of HCl. Added to the solution cooled down to a temperature of 50°–60°C was 5 mmoles of bis-adduct of Formula I (Ar = 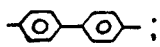;

R = H) and the mixture was gradually heated to 200°C and was held at this temperature during 16 hours. The solution cooled down to a temperature of 70°–80°C was precipitated into water, washed with hot water, then with a solution of ammonium carbonate and then again with water up to a neutral reaction. After a heat treatment at 300°C and a pressure of $10^{-5}$ mm Hg the ⊓⊓ polymer with obtained, the yield being equal to 82%.

Found in per cent: C, 78.98; H, 3.51; N, 13.62. Calculated for $C_{42}H_{22}N_6O_2$: C, 78.49; H, 3.45; N, 13.08. $[\eta] = 0.84$.

EXAMPLE 3

5 mmoles of bis-adduct of Formula I (Ar= 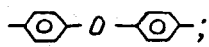;

R=H) and 5 mmoles of 4,4'-diaminodiphenyl ester was treated according to the method of Example 1, and the ⊓AK polymer was obtained with a yield of 72%, $[\eta] = 0.18$.

Found in per cent: C, 68.94; H, 4.42; N, 7.96. Calculated for $C_{42}H_{28}N_4O_8$: C, 70.4; H, 3.94; N, 7.82.

Then the ⊓⊮ polymer (with the initial Ar and R) was produced, the yield being equal to 68% with $[\eta]=0.24$.

Found in per cent: C, 73.2; H, 3.42; N, 8.54. Calculated for $C_{42}H_{24}N_4O_6$: C,74.11; H, 3.55; N, 8.23.

EXAMPLE 4

5 mmoles of bis-adduct of Formula I (Ar= 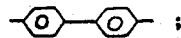;

R = H) and 5 mmoles of benzidine hydrochloride was treated according to the method of Example 2 to produce the ⊓⊮ polymer with a yield of 74%, $[\eta]= 0.23$.

Found in per cent: C, 76.3; H, 4.22; N, 8.84. Calculated for $C_{42}H_{24}N_4O_4$: C, 77.7, H, 3.73; N, 8.64.

EXAMPLE 5

Added to 5 mmoles of bis-adduct of Formula I (Ar= 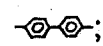;

R = Ph) in 30 ml of DMSO during 2 hours at 65°C was 4.95 mmoles of 3,3',4,4'-tetraminodiphenylmethane in 20 ml of DMSO in an argon flow and the mixture was heated during 18 hours. The product was precipitated into absolute methanol, and washed, thus producing the AAK polymer, the yield being equal to 86%, [η] = 0.28.

Found in per cent: C, 72.6; H, 4.96; N, 9.27. Calculated for $C_{55}H_{40}N_6O_6$: C,73.14; H, 4.8; N, 9.15.

The ⊓AAK product was heated 300°C in a vacuum of $10^{-4}$ mm Hg and the ⊓⊓ polymer was obtained with a yield of 86%, [η]= 0.34.

Found in per cent: C, 79.8; H, 3.74; N, 10.8. Calculated for $C_{55}H_{32}N_6O_2$: C, 77.6; H, 3.55; N, 10.6.

EXAMPLE 6

The ⊓⊓ polymer was produced from 5 mmoles of bis-adduct of Formula I (Ar=

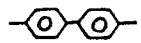

R = Ph) and 3,3-diaminobenzidine tetrachloride by the method described in Example 2, the yield being equal to 79% and [η] = 0.44.

Found in per cent: C, 79.8; H, 4.02; N, 10.34. Calculated for $C_{54}H_{30}N_6O_2$: C,81.6; H, 3.78; N, 10.58.

EXAMPLE 7

10 mmoles of bis-adduct of Formula II (Ar=

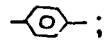

R = H) and 10 mmoles of 3,3',4,4'-tetraminodiphenyl ester was treated by the method of Example 1 and the AAK polymer was produced with a yield of 72% and [η] = 0.38.

Found in per cent: C, 67.2; H, 4.42; N, 9.24. Calculated for $C_{34}H_{24}N_4O_7$: C, 68.0; H, 4.0; N, 9.34.

After heat treatment of ⊓AAK at 300°C in a vacuum, ⊓⊓ was produced with a yield 86% and [η] = 0.58.

Found in per cent: C, 78.1; H, 3.17; N 10.87. Calculated for $C_{34}H_{16}N_4O_3$: C, 77.3; H, 3.03; N, 10.6.

EXAMPLE 8

10 mmoles of bis-adduct of Formula II (Ar =

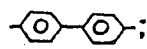

R = H) and 10 mmoles of 3,3'-diaminobenzidine tetrachlorohydrate was treated by the method of Example 2 and ⊓⊓ was produced, the yield, 82%, [η]= 0.62.

Found, per cent: C, 81.1; H 3.34; N, 9.88. Calculated for $C_{40}H_{20}N_4O_2$: C, 81.6; H, 3.4; N, 9.65.

EXAMPLE 9

By using the method of Example 2, ⊓⋈ was produced from 5 mmoles of bis-adduct of Formula II (Ar =

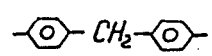

R = H) and 5 mmoles of n-phenylenediamine hydrochloride, the yield 78%, [η]= 0.21.
Found, per cent: C, 82,2; H, 4.16; N, 4.32. Calculated for $C_{48}H_{30}N_2O_{42}$: C, 82.5; H, 4.3; N, 4.01.

EXAMPLE 10

2 mmoles of bis-adduct of Formula II (Ar =

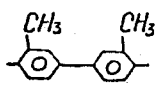

R = naphthyl) and 2 mmoles of 3,3'-diaminobenzidine hydrochloride was treated by the method of Example 2 to produce with a yield 83%, [η]= 0.28.

Found, per cent: C, 84.8; H, 4.34; N, 6.52. Calculated for $C_{62}H_{36}N_4O_2$: C, 85.7; H, 4.15; N, 6.45.

EXAMPLE 11

10 mmoles of bis-adduct of Formula IV (R' = >C<; R=H) and 10 mmoles of 1,4,5,6-tetraminonaphthalene was treated by the method described in Example 1 to produce ⊓AAK with a yield 72%, [η] = 0.49.

Found in per cent: C, 60.4; H, 5.52; N, 9.15. Calculated for $C_{33}H_{28}N_4O_{10}$: C, 61.8; H, 4.38; N, 8.75.

A heat treatment of ⊓AAK resulted in a respective ⊓⊓, the yield 98%, [η] = 0.76.

Found, per cent: C, 69.3; H, 3.8; N, 10.4. Calculated for $C_{33}H_{20}N_4O_6$: C, 69.7; H, 3.52; N, 9.85.

EXAMPLE 12

⊓⋈ was produced from 5 mmoles of bis-adduct of Formula IV (R' =

R = Ph) and 5 mmoles of 1,4-diaminonaphthalene by the method described in Example 2. The yield 83%, [η]= 0.42.

Found, per cent: C, 73.9; H, 4.62; N, 3.56. Calculated for $C_{50}H_{38}N_2O_9$: C, 74.1; H, 4.7; N, 3.46

EXAMPLE 13

⊓⊓ was produced from 5 mmoles of bis-adduct of Formula IV (R' =

R = Ph) and 5 mmoles of tetrachlorhydrate of 1,2,4,5-tetraminobenzene by using the method described in Example 2. The yield 87%, [η] = 0.93.

Found, per cent: C, 74.3; H, 3.18; N, 7.68. Calculated for $C_{46}H_{25}N_4O_7$: C, 74.1; H, 3.36; N, 7.52.

EXAMPLE 14

10 mmoles of bis-adduct of Formula III (Ar =

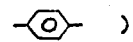

and 10 mmoles of free base of 3,3'-diaminobenzidine was treated by the method described in Example 1 to produce with a yield 72%, [η]= 0.39.

Found, per cent: C, 67,14; H, 4.62; N, 8.51. Calculated for $C_{38}H_{28}N_4O_8$: C, 68.4; H, 4.15; N, 8.33.

After a heat treatment ⊓AAK is transformed into a respective ⊓⊓, the yield 79%, [η = 0.49.

Found, per cent: C, 76.4; H, 3.72; N, 9.48. Calculated for $C_{38}H_{20}N_4O_4$: C, 76.5; H, 3.35; N, 9.38.

EXAMPLE 15

By using the method described in Example 1, ⊓⋈ was produced from 10 mmoles of bis-adduct of Formula III (Ar =

and 10 mmoles of hydrochloric tolydine. The yield 88%, [η] = 0.38.

Found, per cent: C, 75.75; H, 4.18; N, 4.95. Calculated for $C_{40}H_{26}N_2O_6$: C, 76.1; H, 4.13; N, 4.45.

EXAMPLE 16

By using the method described in Example 1,⊓AAK was produced from 2 mmoles of bis-adduct of Formula V and 2 mmoles of 3,3',4,4'-tetraminodiphenyl ester. The yield 68%, [η] = 0.49.

Found in per cent: C, 65.15; H, 6.45; N, 9.34. Calculated for $C_{32}H_{36}N_4O_7$: C, 65.3; H, 6.12; N, 9.52.

A heat treatment of ⌐⌐AAK gives ⌐⌐⌐, the yield 97% [η]= 0.54.

Found, per cent: C, 75.1; H, 5.03; N, 10.68. Calculated for $C_{32}H_{28}N_4O_3$: C, 74.4; H, 5,42; N, 10.8.

EXAMPLE 17

By using the method described in Example 2, ⌐⌐ is produced from 2 mmoles of bis-adduct of Formula V and 2 mmoles of 3,3'-diaminobenzidine hydrochloride. The yield 84%, [η] = 0.72.

Found, per cent: C, 76.3; H, 5.72; N, 10.87. Calculated for $C_{32}H_{28}N_4O_2$: C, 76.8; H, 5.6; N, 11.2.

EXAMPLE 18

By using the method described in Example 2, ⌐I⌐ was produced from 2 mmoles of bis-adduct of Formula V and 2 mmoles of benzidine hydrochloride. The yield 92%, [η]= 0.64.

Found, per cent: C, 75.7; H, 5.61; N, 5.69. Calculated for $C_{32}H_{30}N_2O_4$: C, 75.7; H, 5.92; N, 5.53.

EXAMPLE 19

0.25 mmole (0.53 g) of 3,3'-diaminobenzidine, 0.25 mmole (0.5 g) of 4,4'-diaminodiphenyl ester in 23.7 ml of dimethylacetamide was heated in an argon atmosphere to a temperature of 75°C. 0.5 mmole of bis-adduct of Formula I (Ar =

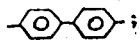

R = Ph) was added to the reaction mixture which was then heated again during 18 hours. After that a copolymer of ⌐AAK and ⌐AK was produced by the method described in Example 1, the yield 79%, [η]= 0.25. After dehydration of the prepolymer, a polymer of a mixed amide and imidazopyrrolonic structure was produced, the yield 84%, [η]= 0.32.

EXAMPLE 20

0.1 mmole of tetrachlorhydrate of 3,3'-diaminobenzidine, 0.4 mmole of benzidine hydrochloride and 0.5 mmole of bis-adduct of Formula II (Ar =

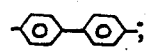

R = H) was treated by the method described in Example 2 and a copolymer of an imide and imidazopyrrolonic structure was produced with a yield 72% and [η]= 0.18.

EXAMPLE 21

0.48 mmole of tetrachlorohydrate of 3,3'-diaminobenzidine, 0.02 mmole of benzidine hydrochloride, and 0.5 mmole of bis-adduct of Formula II (Ar =

R = Ph) was treated by the method described in Example 2, thus producing a respective copolymer with a yield 83%, [η]= 0.42.

EXAMPLE 22

0.4 mmole of bis-adduct of Formula I (Ar =

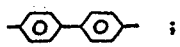

R = H), 0.1 mmole of dianhydride of 1,4,5,7-naphthalenetetracarboxylic acid, and 0.5 mmole of tetrachlorohydrate of 3,3',4,4'-tetraminonaphthalene was treated by the method described in Example 2 to produce poly(aroylene-bis-benzimidasol). The yeild 87%, [η]= 0.74.

EXAMPLE 23

0.25 mmole of bis-adduct of Formula 1 (Ar =

R = Ph) 0.25 mmole of dianhydride of 3,3',4,4'-benzophenonetetracarboxylic acid, and 0.5 mmole of tetrachlorhydrate of 3,3',4,4'-tetraminodiphenyl ester was treated by the method described in Example 2 to produce poly-(aroylene-bis-benzimidasol). The yield 74%, [η]= 0.86.

EXAMPLE 24

0.1 mmole of bis-adduct of Formula I (Ar =

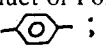

R = Ph), 0.4 mmole of dianhydride of 1,4,5,8-naphthalenetetracarboxylic acid, and 0.5 mmole of tetrachlorohydrate of 3,3'-diaminobenzidine was treated by the method described in Example 2 to produce a respective poly(aroylene-bis-benzimidasol). The yield 86%, [η]= 1.2.

EXAMPLE 25

By using the method described in Example 2, ⌐⌐ was produced from 5 mmoles of bis-adduct of Formula IV (R'=

R = Ph) and 5 mmoles of 3,3'-diaminodiphenyl hydrochloride. The yield 91%, [η] = 0.52.

Found, per cent: C, 74.0; H, 4.81; N, 3.22. Calculated for $C_{50}H_{36}N_2O_9$: C, 74.2; H, 4,81; N, 3.46.

EXAMPLE 26

By using the method described in Example 1, ⌐⌐ was produced from 10 mmoles of bis-adduct of Formula IV (R' =

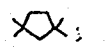

R = Ph) and 10 mmoles of free base of 4,4'-diaminodiphenylmethane. The yield 74%, [η] = 0.37.

Found, per cent: C, 70.4; H, 4.83; N, 4.15. Calculated for $C_{39}H_{30}N_2O_8$: C, 71.7; H, 4.59; N, 4.28.

EXAMPLE 27

By using the method described in Example 1, ⌐⌐ was produced from 5 mmoles of bis-adduct of Formula I (Ar =

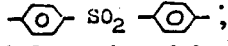

— R = Ph) and 5 mmoles of free base of 4,4'-diaminodiphenylsulphone. The yield 62%, [η] = 0.14.

Found, per cent: C, 67.2; H, 4.05; N, 6.24; S, 7.70. Calculated for $C_{54}H_{32}N_4O_8S_2$: C, 69.8; H, 3.45; N, 6.03; S, 6.89.

EXAMPLE 28

By using the method described in Example 2, ⌐⌐ was produced from 5 mmoles of bis-adduct of Formula I (Ar =

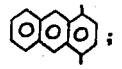

R = H) and 5 mmoles of 4,4'-diaminodiphenylsulphide hydrochloride. The yield 86%, [η]= 0.64.

Found, per cent: C, 74.1; H, 3.58; N, 7.62; S, 4.83. Calculated for $C_{44}H_{24}N_4O_4S$: C, 75.0; H, 3.41; N, 7.98; S, 4.54.

EXAMPLE 29

By using the method described in Example 2, ⌐⌐ was produced from 15 mmoles of bis-adduct of Formula III (Ar=

[structure]

) and 15 mmoles of tetrachlorhydrate of 3,3'-diaminobenzidine The yield 78%, $[\eta]= 1.18$.

Found, per cent: C, 73.2; H, 3.34; N, 7.96. Calculated for $C_{42}H_{22}N_4O_6$: C, 74.4; H, 3.25; N, 8.26.

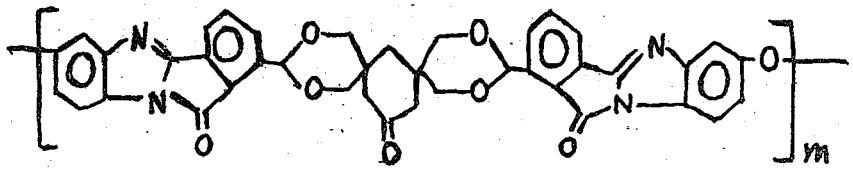

We claim:

1. Thermostable heterocyclic polymers selected from the group consisting of polyimide, polyimidazopyrrolone, and a copolymer of an imide and imidazopyrrolonic structure and consisting substantially of units of the general formulae:

[three polymer structural formulae]

where M stands for:

a. $-CH=N-R^1-N=CH-$; $R^1$ is arylene selected from the group consisting of

[structures: phenylene, biphenylene, terphenylene, biphenyl, dimethyl biphenyl]

$-\langle O \rangle - R^{II} - \langle O \rangle -$;

$R''$ is selected from the group consisting of $CH_2$, O, $SO_2$, S and NH;

b. arylene selected from the group consisting of

[structures: phenylene, naphthylene, biphenylene, dimethyl biphenyl]

and $-\langle O \rangle - R^{III} - \langle O \rangle -$;

$R^{III}$ is selected from the group consisting of $CH_2$, O and $SO_2$;

c.

$$-CH_2O\overset{O}{\underset{\|}{C}}-R^{IV}-\overset{O}{\underset{\|}{C}}OCH_2-;$$

$R^{IV}$ is arylene selected from the group consisting of

[structures: phenylene, naphthylene, biphenylene]

or d.

$$\text{CH}\underset{OCH_2}{\overset{OCH_2}{<}}R^V\underset{CH_2O}{\overset{CH_2O}{>}}\text{CH}-;$$

$R^V$ is selected from the group consisting of

[structures with $R^{VI}$]

$R^{VI}$ is selected from the group consisting of H, HO and =O;

R is selected from the group consisting of an H atom, phenyl and naphthyl;

$n$ is a number including 1 and 2;

Ar is arylene selected from the group consisting of

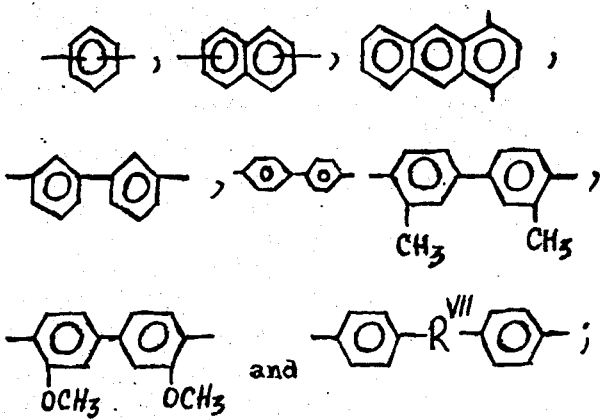

$R^{VIII}$ is selected from the group consisting of $CH_2$, O, $SO_2$, S and NH;

Ar' is a tetravalent aromatic radical selected from the group consisting of

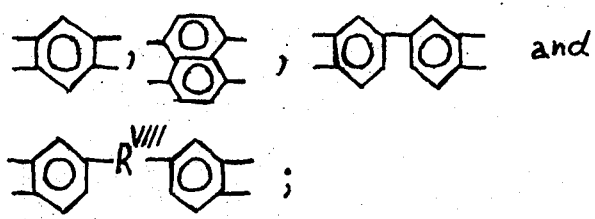

$R^{VIII}$ is selected from the group consisting of $CH_2$ and O, and $m$ is a number sufficient for provision of an intrinsic viscosity of the polymers in a solution of sulphuric acid of at least 0.06 at 25°C.

2. A polymer consisting essentially of the formula:

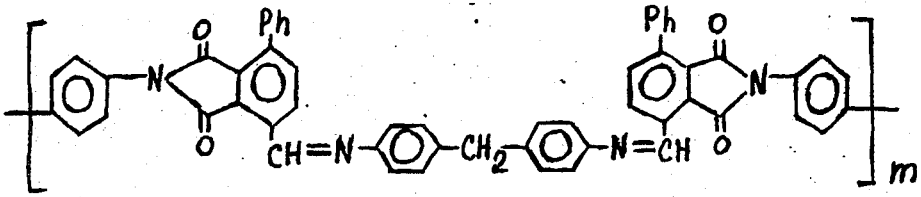

wherein Ph is phenyl.

3. A polymer consisting essentially of the formula:

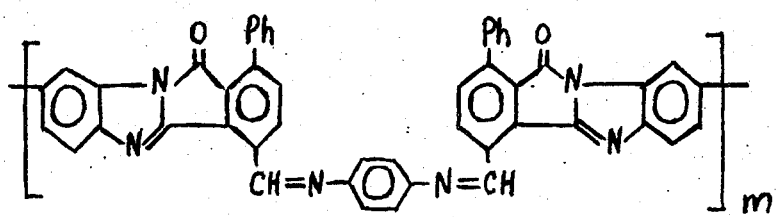

wherein Ph is phenyl.

4. A polymer consisting essentially of the formula:

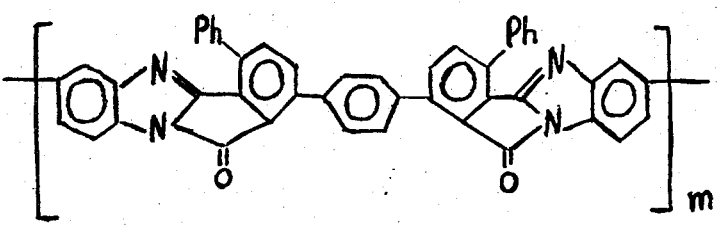

wherein Ph is phenyl.

5. A polymer consisting essentially of the formula:

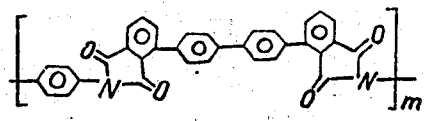

6. A polymer characterized by the formula:

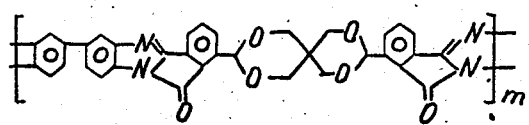

7. A polymer consisting essentially of the formula:

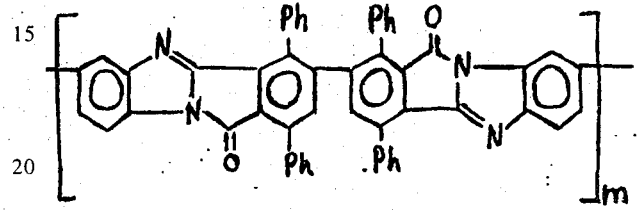

wherein Ph is phenyl.

8. A polymer consisting essentially of the formula:

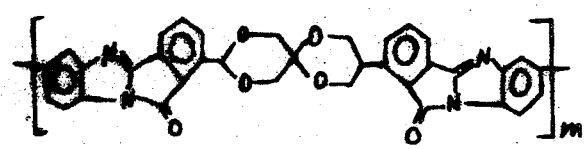

9. A method of producing thermostable heterocyclic polymers selected from the group consisting of polyimide, polyimidazopyrrolone and a copolymer of imide and imidazopyrrolonic structure, which comprises reacting aromatized bis-adducts of the Diels-Alder reaction between maleic anhydride and bis-furanic compounds with an amine component selected from the group consisting of an aromatic diamine, aromatic tetramine and a mixture of aromatic diamine and, aromatic tetramine, one of said initial monomers being taken in excess not higher than 10% at a temperature of 0°–350°C in an atmosphere of an inert gas selected from the group consisting of Ar, $N_2$, $CO_2$, and He, during a time period required for obtaining an intrinsic viscosity of solutions of said polymers in sulphuric acid of at least 0.06 dl/g.

10. A method as claimed in claim 9, wherein one of said initial monomers is composed of bis-adducts of the Diels-Alder reaction between maleic anhydride and N,-N'-bis(5-R-furfurylidene)diaminoarylenes, where R is selected from the group consisting of an atom H, phenyl, and naphthyl.

11. A method as claimed in claim 9, wherein one of said initial monomers is composed of bis-adducts of the Diels-Alder reaction between maleic anhydride and bis(5-R-2-furyl)arylenes, where R is selected from the group consisting of an H atom, phenyl, and naphthyl.

12. A method as claimed in claim 9, wherein one said initial monomer is composed of aromatized adducts of the Diels-Alder reaction between maleic anhydride and bis-furfuryl esters of aromatic dicarboxylic acids selected from the group consisting of terephthalic, 1,4,-, 1,5-, 2,6-, 2,7-naphthalenedicarboxylic, and 4,4'-diphenyldicarboxylic acids.

13. A method as claimed in claim 9, wherein one of said initial monomers is composed of aromatized bis-adducts of the Diels-Alder reaction between maleic anhydride and bis-furanic compounds selected from the group consisting of 3,9-bis(5-R'-2-)-furyl)-2,4,8,10-tetraoxaspiro(5,5)undecane, 3,11-bis(5-R'-2-)-furyl-15,-R-2-2,4,10,12-tetraoxadispiro-(5,1,5,3)hexadecane, 3,11-bis-(5-R'-furyl)-7-R-2,4,10,12-tetraoxadispiro (5,1,5,2) pentadecane, where R is selected from the group consisting of H, OH, and =O; R' is selected from the group consisting of hydrogen, phenyl, and naphthyl.

14. A method as claimed in claim 9, wherein one of said initial monomers is composed of 2,2',5,5'-tetraphenyldiphenyl-3,3',4,4'-tetracarboxylic acid-3,3',4,4'-dianhydride.

15. A method as claimed in claim 9, wherein the amino component consists of a compound selected from the group consisting of p- and m-phenylenediamines, benzidines, toluidine, anisidine, 3,3'-diaminodiphenyl, 4,4'-diaminodiphenylmethane, 4,4'-diaminodiphenyloxide, 4,4'-diaminodiphenylsulphone, 4,4'-diaminodiphenylsulphide, 4,4'-diaminodiphenylamine, 1,4-, 1,5- and 2,7-diaminonaphthalenes, 1,4-diaminoanthracene, 3,3'-diaminobenzidine, 3,3',4,4'-tetraminodiphenylmethane, 3,3',4,4'-tetraminodiphenyloxide, 1,2,4,5-tetraminobenzene, 1,4,5,8-tetraminonaphthalene, and hydrochlorides of the above-mentioned amines.

16. A method as claimed in claim 9, wherein said initial monomers taken in equimolecular quantities are reacted in a medium of polyphosphoric acid at a temperature of 160°–210°C in an atmosphere of an inert gas selected from the group consisting of Ar, $N_2$, $CO_2$, and He during 4 to 24 hours to obtain a desirable intrinsic viscosity of the produced polymers, the latter being then subjected to a heat treatment at a temperature of 200° to 350°C in a vacuum better than $10^{-1}$ mm Hg.

17. A method as claimed in claim 9, wherein added to said amino component is an equimolecular quantity of a mixture of said bis-adduct and dianhydride of tetracarboxylic acid selected from the group consisting of pyromellitic, 1,4,5,8-naphthalenetetracarboxylic, 3,4,-9,10-perylenetetracarboxylic, 3,3',4,4'-benzophenonetetracarboxylic, 3,3',4,4'-diphenyloxytetracarboxylic acids, the ratio of the components in said mixture varying from 0.01:1 to 1:0.01.

18. A polymer consisting essentially of the formula: